United States Patent Office 2,968,450
Patented Jan. 17, 1961

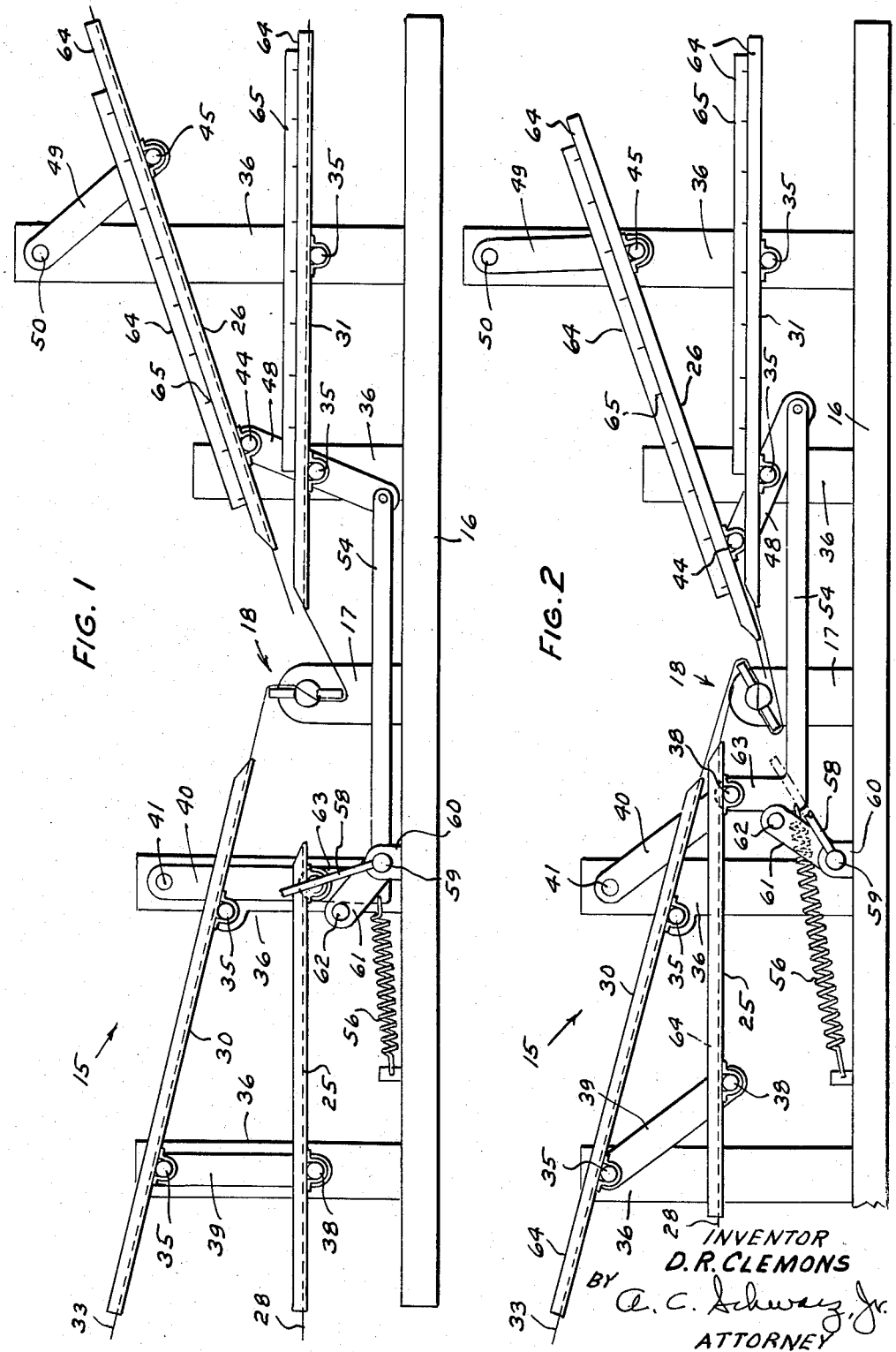

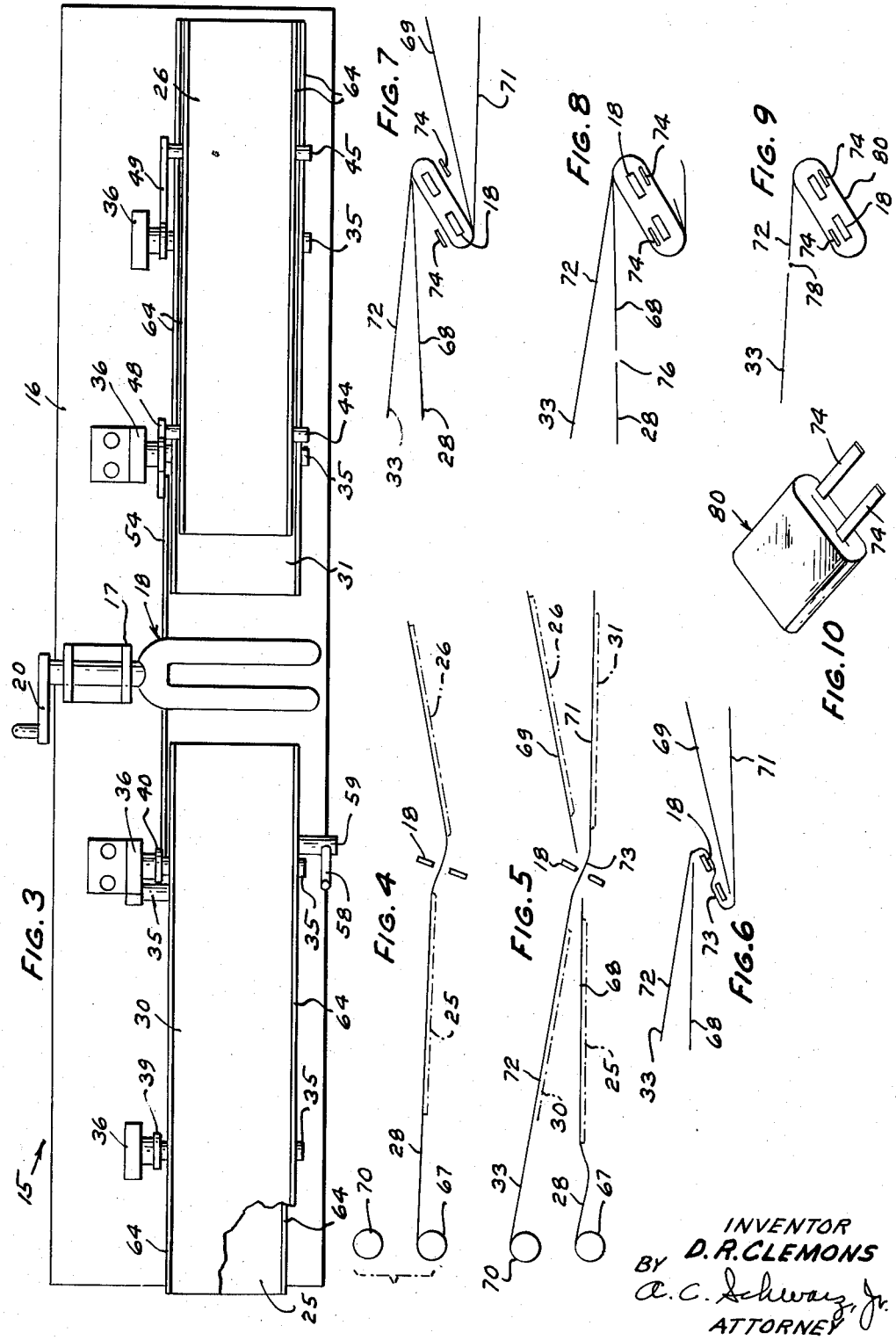

2,968,450

MACHINE FOR CENTER-WINDING CAPACITORS

Dale R. Clemons, Riverside, Ill., assignor to Western Electric Company, Incorporated, New York, N.Y., a corporation of New York Filed Oct. 7, 1959, Ser. No. 845,017

4 Claims. (Cl. 242—67.1)

This invention relates to a machine for center-winding capacitors and more particularly to machines for winding strips of foil and of dielectric material into capacitors.

An object of the present invention is to provide a machine for effectively and efficiently winding capacitors.

Another object of the invention is the provision of a machine for center-winding capacitors from strips of foil and of dielectric material.

With these and other objects in view, the invention contemplates the provision of a slotted arbor mounted on a support for rotation about a horizontal axis and a pair of trays mounted on the support in alignment with and on opposite sides of the arbor for movement to advanced positions adjacent the arbor so that a foil strip may be advanced along the trays to pass a measured length of the strip through the slotted arbor which length is indicated by a scale on one of the trays whereby the foil strip may be severed at the arbor and the trays moved in opposite directions from the arbor to provide foil sections on opposite sides of the arbor. A pair of fixed trays are mounted on the support in alignment with and on opposite sides of the arbor with one of them above one movable tray and the other below the other movable tray to permit a dielectric web to be advanced thereon to a predetermined position with a center portion thereof disposed in the slotted arbor and one portion on one side of the arbor below one foil section and another section disposed on the other side of the arbor above the other foil section. The movable trays are then actuated to advance the ends of the two foil sections into engagement with the arbor and the arbor is then rotated to wind the two foil sections and the two web portions together.

A pair of terminals may be inserted between the web and the foil sections during the winding of the capacitor and after the foil sections and corresponding lengths of the dielectric web have been wound together on the arbor, the foil strip is severed to separate the foil supply from the capacitor and the arbor is rotated to wind a portion of the web around the capacitor after which the web is severed to separate the capacitor from the web supply.

Other objects and advantages of the invention will be more readily understood by reference to the following detailed description thereof and the accompanying drawings in which:

Fig. 1 is a side view of the apparatus showing a winding arbor and movable foil-supporting trays in a normal retracted position relative to the arbor;

Fig. 2 is a side view of the apparatus similar to Fig. 1 showing the movable trays in their advanced positions relative to the arbor;

Fig. 3 is a plan view of the apparatus;

Fig. 4 is a diagrammatic view showing a foil strip extending from a supply roll through the slotted arbor and supported on the movable trays in a predetermined relation thereto;

Fig. 5 is a diagrammatic view similar to Fig. 4 showing the foil strip severed and separated relative from the arbor and showing the dielectric web extending from a supply roll thereof through the arbor and supported on a pair of fixed trays in a predetermined relation thereto;

Fig. 6 shows a fragmentary diagrammatic view of the slotted arbor with a portion of the dielectric web wound thereon and the end portions of the foil strips in position to be gripped therebetween;

Fig. 7 is a diagrammatic view of the arbor with the dielectric web and foil strips partially wound thereon and showing a pair of terminals being inserted therein;

Fig. 8 is a diagrammatic view showing the capacitor at a later stage of the winding operation with the trailing end of the foil being severed;

Fig. 9 is a diagrammatic view of the capacitor-winding operation at a later stage showing the dielectric web being severed; and Fig. 10 is a perspective view of the completed capacitor.

Referring to the drawings, the capacitor-winding machine 15 comprises a base 16 having a standard 17 for supporting a slotted arbor 18 for rotation about a horizontal axis. A crank 20 (Fig. 3) or suitable power-operated means may be provided for rotating the arbor.

The machine is provided with a pair of movable trays or chutes 25 and 26 disposed on opposite sides of the arbor for supporting a foil strip 28 (Fig. 4) and a pair of stationary trays or chutes 30 and 31 disposed on opposite sides of the arbor for supporting a dielectric web 33 (Fig. 5). The stationary trays are mounted on a pair of rods 35, 35 which are secured to and extend horizontally from standards 36, 36 extending upwardly from the base 16. The movable tray 25 is supported on a pair of rods 38, 38 which are fixed to and extend horizontally from the lower ends of a pair of links 39 and 40 which, at their upper ends, are pivotally supported respectively on one of the rods 35 and on a pivot 41 on two of the standards 36, 36. The tray 26 is supported on a pair of rods 44 and 45 which are fixed to and extend from the upper end of a lever 48 and the lower end of a link 49 respectively. The link 49 is pivotally connected at its upper end 50 to one of the standards 36 and the lever 48 is pivotally supported intermediate its ends on one of the rods 35.

At its lower end, the lever 48 is connected to one end of an L-shaped link 54 the other end of which is pivotally connected to one of the rods 38 of the movable chute 25. The lever 48 and the link 54 form a linkage connecting the movable trays 25 and 26 together for simultaneous movement in opposite directions to and from normal retracted positions (Fig. 1) and advanced positions (Fig. 2). A spring 56 connected at one end to the base 16 and at its other end to the link 54 yieldably maintains the movable trays 25 and 26 in their normal retracted positions in which they are stopped by the engagement of the link 40 with one of the supporting rods 35 (Fig. 1).

Movement of the movable trays 25 and 26 to their advanced positions (Fig. 2) is imparted thereto by a manually operated lever 58 fixed to a rod 59 which is mounted in a bracket 60 and has an operating arm 61 thereon provided with a pin 62 that slidably engages the vertical portion 63 of the link 54. As seen in Figs. 2 and 3, the trays 25, 26, 30 and 31 are disposed in horizontal and oblique positions in substantial alignment with the arbor 18 for directing the dielectric web 33 and the foil 28 along predetermined paths relative thereto, and these trays have upwardly directed flanges 64 thereon for guiding the foil strips and the web laterally in a predetermined aligned relation to each other. Scales 65 may be provided on the upwardly extending flanges 64 of the trays 26 and 31 to indicate the length of the foil and the web supported thereon.

In the fabrication of a capacitor, the movable trays 25 and 26 are actuated to their advanced positions as shown in Fig. 4, the end of the foil strip 28 is withdrawn from a supply roll 67 thereof, advanced along the tray 25, through the slot in the arbor 18 and stopped at a predetermined point so that a measured length of the foil extends beyond the arbor and is supported on the tray 26. The foil is then severed along the axis of the arbor to provide foil sections 68 and 69 (Fig. 5) on opposite sides of the arbor 18, and then the movable trays 25 and 26 are returned to their normal retracted positions to separate the ends of the foil sections 68 and 69 from each other and the arbor. The end of the dielectric web 33 is withdrawn from a supply roll 70 thereof and advanced along the tray 30, through the slotted arbor 18 and stopped at a predetermined position to provide a first web portion 71 on one side of the arbor 18 below and longer than the foil section 69, a second web portion 72 on the other side of the arbor above the foil section 68, and a center portion 73 disposed in the slot of the arbor.

The arbor 18 is then rotated to wind a portion of a convolution of the web 33 thereonto as indicated in Fig. 6 and the movable trays 25 and 26 are moved from their normal retracted to their advanced positions to carry the ends of the foil sections 68 and 69 into engagement with the arbor 18 and the web 33 being wound thereon so that the foil sections are gripped between the web and the arbor and wound with the web onto the arbor. After a predetermined number of revolutions, the arbor 18 is stopped and a pair of flat terminals 74 (Fig. 7) are inserted between the foil sections 68, 69 and the web 33 of the partially wound capacitor.

The arbor is again rotated to complete the winding of foil section 69 thereon as shown in Fig. 8 at which time the arbor is stopped and the foil strip 28 is severed at 76 to separate the foil section 68 from the supply thereof. The arbor is then rotated to wind the trailing end of the foil section 68 and a portion of the web 33 around the capacitor and the arbor is again stopped to permit the severance of the web 33 at 78 (Fig. 9) to separate the portion 72 of the web from the supply thereof. The trailing end of the web portion 72 is then wound around the capacitor, and an adhesive may be applied to the web to adhere the trailing end thereof to the capacitor. The completed capacitor 80 (Fig. 10) is then removed from the arbor.

Although the capacitor has been disclosed as having a single web of dielectric separating the foil strips, it will be understood that any number of dielectric webs may be used. When two or more dielectric webs 33 are used to insulate the foil strips from each other, the webs are withdrawn from supply rolls thereof conveniently arranged in side by side relation to each other, and the webs are supported in superposed relation one to the other on the trays 30 and 31 in the same manner as a single web 33.

It is to be understood that the above-described arrangements are simply illustrative of the application of this invention. Numerous other arrangements may be readily devised by those skilled in the art which will embody the principles of the invention and fall within the spirit and scope thereof.

What is claimed is:

1. In a capacitor-winding machine, a slotted arbor, mounting means for supporting the arbor for rotation about a horizontal axis, a first pair of trays supported on said mounting means in vertically spaced relation to each other on one side of a vertical plane through the axis of said arbor and converging toward said arbor for supporting strip material thereon in substantial alignment with said arbor, a second pair of trays supported on said mounting means in vertically spaced relation to each other on the other side of said plane and converging toward said arbor for supporting strip material thereon in substantial alignment with said arbor, means for moving the upper one of one pair and the lower one of the other pair of said trays simultaneously toward and away from said arbor, whereby a strip of dielectric material may be supported on one tray of each pair of trays with the center portion of the strip in the slotted arbor and sections of a foil strip may be supported on the movable trays and advanced into engagement with the arbor, and means for rotating the arbor to wind the dielectric strip and the sections of foil strip thereon into a capacitor.

2. In a capacitor-winding machine, a rotatable slotted arbor, mounting means for supporting the arbor for rotation about a horizontal axis, a first pair of trays on said mounting means in vertically spacer relation to each other on one side of a vertical plane through the axis of said arbor and a second pair of trays on said mounting means in vertically spaced relation to each other on the other side of said plane for supporting strip material thereon in substantial alignment with said arbor, means for moving the upper one of one pair and the lower one of the other pair of said trays simultaneously toward and away from said arbor, whereby a strip of dielectric material may be supported on one tray of each pair of trays with the center portion of the strip in the slotted arbor and sections of a foil strip may be supported on the movable trays and advanced into engagement with the arbor, means for rotating the arbor to wind the dielectric strip and the sections of foil strip thereon into a capacitor, and a scale on one of said trays to indicate the length of the strip thereon.

3. In a capacitor-winding machine, a rotatable slotted arbor, mounting means for supporting the arbor, a pair of trays fixedly mounted on said mounting means on opposite sides of the arbor in substantial alignment therewith for supporting a dielectric web thereon with an intermediate portion of the web disposed in the slotted arbor, a pair of trays movably mounted on said mounting means on opposite sides of the arbor and with one of said movable trays positioned above one of the fixed trays and with the other movable tray positioned below the other fixed tray for supporting sections of foil strip in substantial alignment with the arbor, means for simultaneously actuating said movable trays from normal retracted positions in spaced relation to said arbor to advanced positions adjacent to said arbor to feed the ends of the sections of foil strip into engagement with the arbor, and means for rotating the arbor to wind the dielectric web and the sections of foil strip thereon into a capacitor.

4. In a capacitor-winding machine, a rotatable slotted arbor, mounting means for supporting the arbor, a pair of trays fixedly mounted on said mounting means on opposite sides of the arbor in substantial alignment therewith for supporting a dielectric web thereon with an intermediate portion of the web disposed in the slotted arbor, a pair of trays movably mounted on said mounting means on opposite sides of the arbor and with one of said movable trays positioned above one of the fixed trays and with the other movable trays positioned below the other fixed tray for supporting sections of a foil strip in substantial alignment with the arbor, linkage on said mounting means for pivotally supporting said movable trays for movement to and from advanced positions adjacent the arbor and retracted positions in spaced relation thereto, resilient means for yieldably retaining said movable trays in said retracted positions, means for simultaneously actuating said movable trays to said advanced position to feed the ends of the sections of foil strip into engagement with the arbor, and means for rotating the arbor to wind the web and the sections of foil strip thereon into a capacitor.

References Cited in the file of this patent

UNITED STATES PATENTS

| | | |
|---|---|---|
| 1,963,381 | Purdy | June 19, 1934 |
| 2,480,591 | Mitchell | Aug. 30, 1949 |